United States Patent
Shibue et al.

[11] Patent Number: 6,036,913
[45] Date of Patent: Mar. 14, 2000

[54] CELLULOSE ESTER FILM MANUFACTURING METHOD

[75] Inventors: Toshiaki Shibue; Toshiyuki Hagiwara; Katsuhito Yamanaka, all of Hino, Japan

[73] Assignee: Konica Corporation, Tokyo, Japan

[21] Appl. No.: 09/028,891

[22] Filed: Feb. 24, 1998

[30] Foreign Application Priority Data

| Feb. 27, 1997 | [JP] | Japan | 9-043730 |
| Mar. 27, 1997 | [JP] | Japan | 9-074855 |

[51] Int. Cl.[7] .................... B29D 7/01
[52] U.S. Cl. ............ 264/489; 264/217; 264/344
[58] Field of Search .............. 264/2.6, 85, 217, 264/344, 489, 28, 237, 234, 345, 348

[56] References Cited

U.S. PATENT DOCUMENTS

| 2,167,909 | 8/1939 | Rooney et al. | 264/217 |
| 2,232,012 | 2/1941 | Rooney et al. | 264/217 |
| 2,319,051 | 5/1943 | Fordyce et al. | 264/217 |
| 3,857,759 | 12/1974 | Fiore et al. | 549/430 |
| 5,314,647 | 5/1994 | Rieth | 264/217 |

OTHER PUBLICATIONS

English Translation of French Patent 744,570 Dreyfus, Apr. 24, 1933.

Primary Examiner—Jan H. Silbaugh
Assistant Examiner—Kenneth M. Jones
Attorney, Agent, or Firm—Frishauf, Holtz, Goodman, Langer & Chick, P.C.

[57] ABSTRACT

Disclosed is a method of manufacturing a cellulose ester film, the method comprising the steps of dissolving a cellulose ester and a plasticizer in a solvent containing a cyclic diether solvent to obtain a cellulose ester solution, casting the solution on a support to form a cellulose ester film, separating the cellulose ester film from the support, and drying the separated film, wherein the water content of the solution is 0.06 to 15 weight %, and the residual solvent content in the film at the separation step is 50 to 450 weight %.

14 Claims, 2 Drawing Sheets

CELLULOSE ESTER FILM MANUFACTURING METHOD

FIELD OF THE INVENTION

The present invention relates to a cellulose ester film, and a method of manufacturing a cellulose ester film, and particularly to a cellulose ester film, which is manufactured from a solvent being less harmful to the environment, showing excellent photographic properties when applied to photographic light sensitive materials, and a manufacturing method of the cellulose ester film.

BACKGROUND OF THE INVENTION

A cellulose ester film has been widely used in the various fields such as photographic materials and optical materials. A cellulose ester film is conventionally manufactured by casting a cellulose ester solution, in which cellulose ester is dissolved in methylene chloride, on a support to form a film thereon.

However, the use of the methylene chloride solvent has recently been restricted in view of environmental concerns. Therefore, a method employing a dioxolane as an alternative solvent is disclosed in Japanese Patent O.P.I. Publication Nos. 7-278324, 8-143708, and 8-258065. Besides this method, a method of employing dichloromethane in an small amount is disclosed in Japanese Patent O.P.I. Publication No. 9-15792.

However, the cellulose ester film manufactured by the above-mentioned methods does not have satisfactory physical properties for photographic light sensitive materials and has still other practical problems.

SUMMARY OF THE INVENTION

A first object of the present invention is to provide a cellulose ester film, which is manufactured from a solution of a cyclic diether being less harmful to the environment, showing excellent photographic properties when applied to photographic light sensitive materials, and a manufacturing method of the cellulose ester film.

A second object of the present invention is to provide a cellulose ester film which shows an excellent surface smoothness and excellent light transmittance as described later, and further shows excellent tear strength, excellent folding endurance, excellent anti-curl property in water and excellent photographic property such as reduced fog in view of commercial practicality, and a manufacturing method of the cellulose ester film.

DETAILED DESCRIPTION OF THE INVENTION

Figure 1:
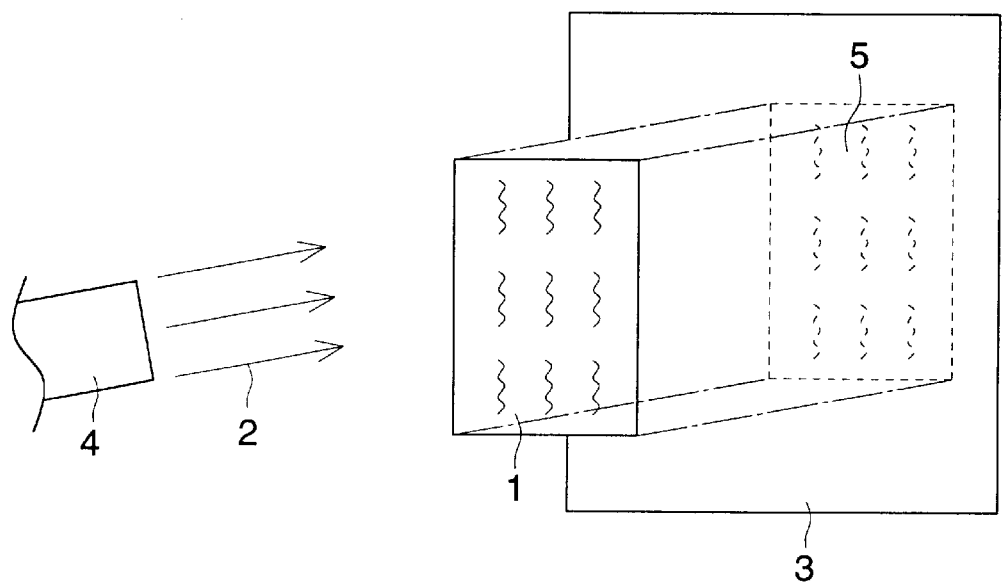
FIG. 1 shows a film image projected on a screen.

There is a great demand for a cellulose ester film for use in photographic light sensitive materials, and the cellulose ester film has a great influence on the environment.

The present inventors have made an extensive study on a cellulose ester film which is manufactured through a solution of a dioxolane being less harmful to the environment, which shows excellent photographic properties when applied to photographic light sensitive materials, and which shows excellent surface smoothness and excellent light transmittance as described later, and further shows excellent tear strength and excellent anti-curl property in water in view of practicality.

As a result, the present inventors have found that the water content of the cellulose ester solution plays an extremely important role, and have reached the present invention.

The above objects of the invention can be attained by the following constitution:

1. a method of manufacturing a cellulose ester film, the method comprising the steps of dissolving a cellulose ester in a solvent containing a cyclic diether solvent to obtain a cellulose ester solution; casting the solution on a support to form a cellulose ester film; and separating the cellulose ester film from the support, wherein the solution contains water in an amount of 0.06 to 15 weight %, and the residual solvent content in the separated film at the separation step is 50 to 450 weight %,
2. the method of item 1 above, wherein the time from the beginning of the casting step to the beginning of the separation step is 3 seconds to 2 minutes,
3. the method of item 1 or 2 above, wherein the surface temperature of the support at the separation step is −70° C. to 40° C. and the residual solvent content at the separation step is 100 to 450 weight %,
4. the method of item 3 above, wherein the support is a casting drum, and the time from the beginning of the casting step to the beginning of the separation step is 3 to 40 seconds,
5. the method of item 1 above, wherein the surface temperature of the support at the separation step is 0° C. to 75° C.,
6. the method of item 5 above, wherein the support is a casting belt, and the time from the beginning of the casting step to the beginning of the separation step is 20 to 120 seconds,
7. the method of item 1 above, wherein the casting is multi-layer casting,
8. the method of item 1, 2, 3, 4, 5, 6, or 7 above, further comprises the step of drying the separated film in a tenter, wherein the residual solvent content in the dried film is 10 to 50 weight %,
9. the method of item 8 above, wherein the drying is carried out by micro waves,
10. a method of manufacturing a cellulose ester film, the method comprising the steps of dissolving a cellulose ester and a plasticizer in a solvent containing a cyclic diether solvent to obtain a cellulose ester solution; casting the solution on a support to form a cellulose ester film; separating the cellulose ester film from the support; and drying the separated film, wherein the water content of the solution is 0.06 to 15 weight %, and the residual solvent content in the film at the separation step is 50 to 450 weight %,
11. a film base for a photographic light sensitive material, wherein the base is manufactured by the method of item 1, 2, 3, 4, 5, 6, 7, 8, 9 or 10 above,
12. a cellulose ester solution for manufacturing a cellulose ester film comprising the steps of casting the solution on a support to form a cellulose ester film, and separating the cellulose ester film from the support, wherein the solution is obtained by dissolving a cellulose ester in a solvent containing a cyclic diether solvent and the solution further contains water in an amount of 0.06 to 15 weight %, 13. a cellulose ester film obtained by dissolving a cellulose ester in a solvent containing a cyclic diether solvent to obtain a cellulose ester solution, casting the solution on a support to form a cellulose ester film, and separating the cellulose ester film from the support, wherein the solution contains water in an amount of 0.06 to 15 weight %, 14. the cellulose ester solution of item 11 above, further containing a plasticizer, or 15. the film base for a photographic light sensitive material of item 10 above, wherein the base contains a plasticizer in an amount of 8 to 20 weight % based on the cellulose ester content.

As described above, the present inventors have made an extensive study on a manufacturing method of a cellulose ester film, and as a result, have found that when a cellulose ester solution, containing water in an amount of 0.06 to 15 weight %, is employed as described above, a cellulose ester film excellent in optical properties, which is suitable for a photographic light sensitive material film base, is obtained with high yield, and the resulting film further has the surprising advantageous effects.

The water content of the cellulose ester solution is preferably 0.1 to 15 weight %, more preferably 1 to 15 weight %, and most preferably 3 to 13 weight %.

The cellulose ester solution containing water in the invention is obtained by dissolving a cellulose ester in a solvent containing water or by adding water to a cellulose ester solution.

The water content of the cellulose ester solution herein referred to is measured by the Karl Fischer's method.

The residual solvent content (weight %) of the cellulose ester film is obtained employing a method of drying to remove the residual solvent as described later.

The apparatus used in the manufacture of the cellulose ester film in the invention may be any of the several conventional types. It is not necessary to modify a support for spreading the cellulose ester solution to form a film, devices for separation of the film after the solvent removal, or conventional apparatuses for manufacturing the cellulose ester film employing methylene chloride or dichloromethane as a solvent of the cellulose ester solution.

The light transmittance of the cellulose ester film herein referred to in the invention is obtained by measuring transmittance at 550 nm. Surface smoothness herein referred to in the invention can be visually observed by diagonally exposing the film surface to light.

More specifically, as shown in FIG. 1, the manufactured film 1 is exposed to parallel light beams 2, and the transmitted light is projected to form an image on a screen 3. The resulting image is visually observed. In FIG. 1, numeral 4 shows an apparatus comprising a light source such as a halogen lamp or a mercury lamp and a device to convert the light emitted therefrom to parallel light beams, and numeral 5 shows the resultant projected image formed on screen 3. This method makes it possible to simultaneously observe plural films or to simultaneously evaluate the films at by plural persons, employing film samples, in which two kinds of films are laminated, and plural projecting apparatuses, resulting in increased evaluation accuracy.

Next, raw materials, manufacturing apparatus and manufacturing conditions for the cellulose ester film in the invention will be explained. The cellulose ester in the invention includes cellulose triacetate, cellulose diacetate, cellulose acetatebutylate, and cellulose acetatepropionate. The cellulose ester in the invention is preferably a cellulose triacetate with a polymerization degree of 250 to 400, and an acetic acid value of 54 to 62.5%, preferably 58 to 62.5%, in view of increased film strength. The cellulose triacetate in the invention is a cellulose triacetate synthesized from cotton lint or a cellulose triacetate synthesized from tree pulp, which can be used singly or in combination.

The acetic acid value herein referred to in the invention is represented by the following equation:

Acetic acid value=(DS×Molecular weight of $CH_3COOH$)/(Molecular weight of $C_6H_{10}O_5$+DS×Molecular weight of $CH_2CO$)

wherein DS represents the number which H of OH in the glucopyranose unit (having three OH groups) of the cellulose chemical structure is substituted with acetyl, $CH_3CO$.

If there is any problem in separation of the film from a belt or drum on which the film is formed, the cellulose triacetate synthesized from cotton lint is preferably used in a larger amount, since the triacetate has good separability, and results in higher productive efficiency. The content of the cellulose triacetate synthesized from cotton lint in a cellulose triacetate mixture is preferably not less than 40 weight %, in view of separability, more preferably not less than 60 weight %, and most preferably 100 weight %.

The plasticizer used in the invention is not limited, but includes a phosphate such as triphenyl phosphate, tricresyl phosphate, cresyldiphenyl phosphate, octyldiphenyl phosphate, diphenylbiphenyl phosphate, trioctyl phosphate, or tributyl phosphate, a phthalate such as diethyl phthalate, dimethoxyethyl phthalate, dimethyl phthalate, dioctyl phthalate, dibutyl phthalate, or di-2-ethylhexyl phthalate, a glycerin ester such as triacetin, or tributyrin, and a glycolic acid ester such as butyl phthalyl butyl glycolate, ethyl phthalyl ethyl glycolate, methyl phthalyl ethyl glycolate, or butyl phthalyl butyl glycolate. These plasticizers may be used singly or in combination.

The preferable plasticizer includes tricresyl phosphate, cresyldiphenyl phosphate, tributyl phosphate, diethyl phthalate, dimethyl phthalate, dioctyl phthalate, dibutyl phthalate, di-2-ethylhexyl phthalate, triacetin, and ethyl phthalyl ethyl glycolate. These plasticizers may be used singly or in combination.

The plasticizer content of the cellulose ester film is preferably 8 to 20 weight % based on weight of the cellulose ester. Further, the plasticizer content of the cellulose ester film for a photographic film is especially preferably 11 to 16 weight % based on weight of the cellulose ester, in view of excellent flexibility, excellent processability and excellent bleeding resistance.

The solvent used in the invention is preferably a mixture solvent of a good solvent and a poor solvent, in view of productive efficiency. The good solvent content of the mixture solvent is preferably 70 to 95 weight %, and the poor solvent content of the mixture solvent is preferably 5 to 30 weight %. The cellulose ester content of the cellulose ester solution in the invention is preferably 10 to 50 weight %, and more preferably 18 to 20 weight %.

In the invention, a good solvent is defined as a solvent capable of dissolving cellulose esters, and a poor solvent as a solvent which only swells and cannot dissolve cellulose esters. Therefore, whether a solvent is a good solvent or a poor solvent for cellulose esters depends on the acetic acid value of the cellulose ester used. For example, acetone is a good solvent for a cellulose ester with an acetic acid value of 55%, but is a poor solvent for a cellulose ester with an acetic acid value of 60%.

As a good solvent in the invention is used a cyclic diether such as a 1,3-dioxolane, which is less harmful to the environment. The 1,3-dioxolane includes 1,3-dioxolane, 2-methyl-1,3-dioxolane, 4-methyl-1,3-dioxolane, 2-ethyl-1,3-dioxolane, 4-ethyl-1,3-dioxolane, and 2,2-dimethyl-1,3-dioxolane. Among these 1,3-dioxolanes, 1,3-dioxolane is especially preferable.

The 1,3-dioxolanes may be used singly, in combination or in combination with other solvents. The 1,3-dioxolanes can be optionally used together with methylene chloride. In this case, the content ratio of the 1,3-dioxolanes to methylene chloride is preferably 10:90 to 90:10 by weight, and more preferably 30:70 to 70:30 by weight.

The poor solvent used in the invention includes an alcohol with 1 to 8 carbon atoms such as methanol, ethanol, or butanol, methylethyl ketone, methylisobutyl ketone, ethyl acetate, propyl acetatcy monochlorobenzene, benzene, cyclohexane, tetrahydrofurane, methylcellosolve, acetone, and toluene. These poor solvents can be used singly or in combination. Methanol, ethanol, n-butanol or cyclohexane is preferable, and n-butanol or cyclohexane is especially preferable, since these solvents enable film separation in the presence of relatively a large amount of the remained solvent, resulting in high productive efficiency.

In the invention, dissolving a cellulose ester in a solvent is carried out according to a conventional method. The preferable method is a method of mixing a cellulose ester with a poor solvent to swell the ester, and then adding a good solvent to the mixture. In this process, the cellulose ester is preferably dissolved with stirring under increased pressure at from the boiling point at atmospheric pressure of the solvent to a temperature at which the solvent is not boiled, since undissolved matters such as gelled lumps do not produce.

The content of the good solvent in the solution is 95 to 75 weight %, and the content of the poor solvent in the solution is 5 to 25 weight %. The cellulose ester solution in the invention optionally contains an additive such as a UV absorbent, a matting agent, a dye, or an anti-oxidizing agent. These additives may be added to a solvent before the cellulose ester is dissolved in the solvent, or to a dope obtained by dissolving the cellulose ester in a solvent.

The vessel for dissolving may be any kinds, and any vessel resistant to a given pressure in which heating or stirring can be carried out under pressure. Meters such as a pressure meter and a thermometer are optionally provided on the vessel.

The pressure application is carried out by incorporating to the vessel an inactive gas such as nitrogen with pressure or by increasing a solvent vapor pressure in the vessel by heating. Heating is preferably carried out outside the vessel, and a jacket type vessel is preferable, since heating temperature is easily controlled.

The heating temperature is preferably in the range of from the boiling point of a solvent used to a temperature at which the solvent is not boiled, for example, preferably in the range of 60° C. to 80–110° C. The pressure applied is determined not to boil the solvent at a given temperature.

After dissolving a cellulose ester in a solvent in a vessel to obtain a dope, the dope is removed from the vessel while cooling, or is removed with a pump and then cooled with a heat exchanger. The resulting cooled dope is used for manufacturing a film. The cooling temperature may be cooled to an ordinary temperature, but is preferably cooled to a temperature of 5 to 10° C. below the boiling point of the solvent, since the viscosity of the dope is reduced for casting.

In the invention, a dope, in which a cellulose ester is dissolved in a solvent containing a cyclic diether, is cast on a support (a casting process), heated (a dope drying process) to remove a part of the solvent and form a film. Thereafter, the film is separated from the support and dried (a film drying process) to obtain a cellulose ester film.

In the invention, the cellulose ester film is preferably manufactured by a method comprising the step of casting a cellulose ester solution on a support having a relatively low temperature to cool the solution or a method comprising the step of casting a cellulose ester solution on a support having a relatively high temperature (a temperature less than the boiling point of the solution, for example, 40 to 75° C.) to remove the solvent.

The former method is typically a drum casting method employing a compact film manufacture apparatus comprising a drum support for casting, and the latter method is typically a belt casting method employing a belt support for casting.

The support used at the casting step is a belt or drum type stainless steel support with a smooth surface. Casting of the solution at the casting step can be carried out in the conventional temperature range of −70° C. to a temperature less than the boiling point of the solvent. In the drum casting method, the drum temperature is preferably 5 to 30° C., since a dope can be gelled to shorten a critical separation time, and more preferably 5 to 15° C. The critical separation time herein referred to implies time when dope is present on a casting support when the dope is cast on the support at a maximum casting speed capable of continuously forming a transparent film with excellent surface smoothness. The critical separation time is preferably short, in view of productive efficiency.

In the belt casting method, the belt support temperature varies depending on the boiling point of solvent used, and the temperature is ordinarily a temperature less than the solvent boiling point, and preferably 40 to 75° C., a relatively high temperature range.

Figure 2:
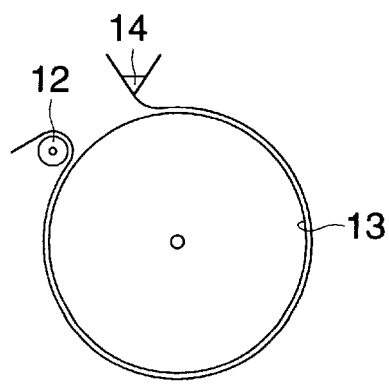
FIG. 2 shows a schematic diagram of a film manufacturing technique for a drum type cellulose ester solution (dope) casting process.

Next, both methods will be explained by figures. FIG. 2 shows a schematic diagram of a film manufacturing technique for a drum type cellulose ester solution (dope) casting process. In FIG. 2, numeral 12 shows a film separating section, numeral 13 shows a drum support, and numeral 14 shows a cellulose ester solution. The vicinity of the separating section is cooled.

Figure 3:
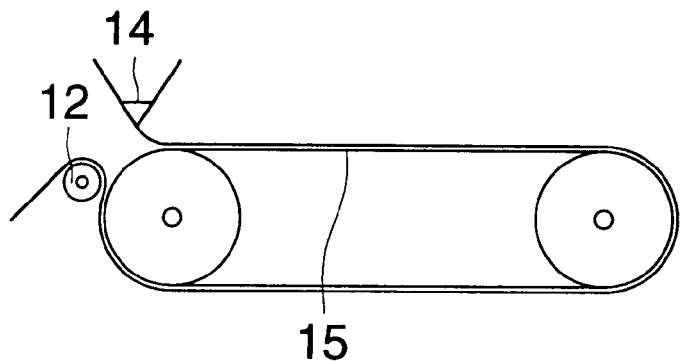
FIG. 3 shows a schematic diagram of a film manufacturing technique for a belt type dope casing process.
Figure 4:
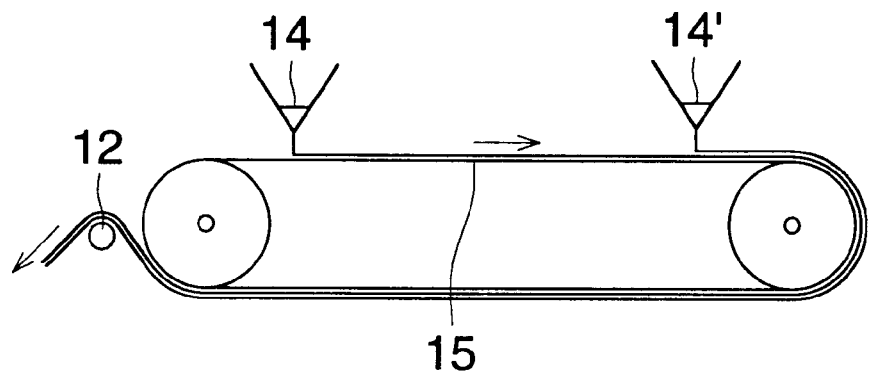
FIG. 4 shows a schematic diagram of a film manufacturing technique for a dope casting process for a double-layered type.

FIG. 3 shows a schematic diagram of a film manufacturing technique for a belt type dope casting process. In FIG. 3, numeral 12 shows a film separating section, numeral 15 shows a belt support, and numeral 14 shows a cellulose ester solution (a dope). FIG. 4 shows a schematic diagram of a film manufacturing technique for a dope casting process for a double-layered type. Numerals 14 and 14' show cellulose ester solutions (dopes). The two dopes 14 and 14', with which two tanks are charged, may be the same or different from each other in the cellulose ester concentration.

In the both methods above, on both sides of a support on which a main cellulose ester solution is mainly cast, a solution with a lower cellulose ester concentration may be spread together, as described in Japanese Patent O.P.I. Publication No. 61-94725.

The temperature of the film during separation is preferably 0 to 30° C., and more preferably 5 to 20° C., since the strength of the film is increased, and film rupture during separation is prevented.

As described in Japanese Patent O.P.I. Publication No. 61-94725, it is preferable that the separated film is further dried while applying a given tension in a transverse direction of the film employing a tenter to be a given amount of the residual solvent in the film.

The residual solvent content of a film in the invention is represented by the following equation:

Residual solvent content=(Weight of volatile components remained in a film)×100 (%)/(Weight of a film after heated at 115° C. for 1 hour)

wherein the weight of volatile components is obtained by subtracting the weight of a film after heated at 115° C. for 1 hour from the weight of a film before heated.

The film separated from a support is further dried in a drying process to give a residual solvent content of the film of preferably 0.5 to 3.5 weight %. In the drying process of the film, the film is generally transporting on rollers or in a tenter while drying. The support film for photographic materials is preferably dried maintaining the film width in a tenter, which increases dimensional stability of the film. It is especially preferable in view of remarked increased film dimensional stability that the film is dried while holding the film width of a film immediately after the film is separated from the support, which still has a relatively high residual solvent content. The means for drying the film is not specifically limited, but heated air, infrared light, heated rollers or micro waves are generally employed. The micro waves are preferably used in view of drying efficiency. It is preferable that the drying temperature is gradually elevated in separate 3 to 5 stages in the range of from 40 to 140° C. It is more preferable in view of film dimensional stability that the drying temperature is gradually elevated in separate 3 to 5 stages in the range of from 80 to 140° C.

The cyclic diether content of the film is preferably 0.020 to 4.000 mg/g, more preferably 0.020 to 1.000 mg/g, and still more preferably 0.030 to 0.070 mg/g. The cyclic diether solvent content of the film can be measured according to a gas chromatography (employing Apparatus: HP 5890 SERIESII/HP5971A, HP9746 produced by Hewlett Packard Co. Ltd., Column: DB-WAX (0.25 mmid×60 m, 0.25 m) produced by J & W Scientific Co., Ltd.). The cyclic diether content of 1 g of the film is obtained under conditions of heating at a head space sample temperature of 120° C. for 30 minutes.

The thickness of the cellulose ester film in the invention is preferably 10 to 500 μm, more preferably 80 to 200 μm, and still more preferably 100 to 130 μm.

EXAMPLES

The invention will be detailed in the following examples, but the invention is not limited thereto. In the examples, all parts are by weight, unless otherwise specified.

Example 1
Preparation of Film Samples 1 to 7 (Examples Employing a Belt Type Casting Support)

The following dope composition A was prepared.

| (Dope composition A) | |
| --- | --- |
| Cellulose triacetate synthesized from cotton lint (Acetic acid value of 61.0%) | 30 parts |
| Cellulose triacetate synthesized from tree pulp (Acetic acid value of 61.0%) | 70 parts |
| Triphenyl phosphate (Solidifying point* 49° C.) | 10 parts |
| Ethylphthalylethyl glycolate (EPEG) | 5 parts |

| -continued | |
| --- | --- |
| (Dope composition A) | |
| Dichloromethane | 250 parts |
| Ethanol | 50 parts |

*The solidifying point is the solidifying point as described in "Kagaku Daijiten", published by Kyoritsu Shuppann Co., Ltd.

The above dope composition was placed in a vessel, and heated at 110° C. while stirring to obtain a solution (a dope) in which the cellulose triacetate was dissolved. The resulting dope was filtered, and uniformly cast at 75° C. according to a double layer (60 μm+60 μm) casting method on the stainless steel support (a belt support) of a belt type casting apparatus, dried at 75° C. to form a film so that the film could be separated from the support belt, and the resulting film was separated from the support. The residual solvent content in the separated film was 120 weight %. Time required from the casting to the separating was 1 minute.

The separated film was hold with a tenter and transported at 110° C. for 12 minutes in a drying zone to obtain a triacetyl cellulose film. Thus, film samples 1 to 7 were obtained.

The water content by weight % (measured according to the Karl Fischer's method) of the dope for each sample was adjusted to those as shown in Table 1.

Preparation of Film Sample 8 (Example Employing a Drum Casting Support)

| (Dope composition B) | |
| --- | --- |
| Cellulose triacetate synthesized from cotton lint (Acetic acid value of 61.0%) | 30 parts |
| Cellulose triacetate synthesized from tree pulp (Acetic acid value of 61.0%) | 70 parts |
| Triphenyl phosphate (Solidifying point 49° C.) | 10 parts |
| Ethylphthalylethyl glycolate (EPEG) | 5 parts |
| 1,3-Dioxolane | 180 parts |
| Ethanol | 15 parts |

The above dope composition was placed in a vessel, and heated at 110° C. while stirring to obtain a solution (a dope) in which the cellulose triacetate was dissolved. The resulting dope was filtered, and uniformly spread at 5° C. according to a single layer (120 μm) casting method on the stainless steel drum support of a drum type spreading apparatus, allowed to stand for 6 seconds to form a film, and the resulting film was separated from the support. The residual solvent content in the separated film was 170 weight %.

The separated film was hold with a tenter and transported at 110° C. for 15 minutes in a drying zone to obtain a triacetyl cellulose film. Thus, film sample 8 was obtained.

The water content by weight % (measured according to the Karl Fisher's method) of the dope for sample 8 was 1.0 weight %, as shown in Table 1.

Preparation of Film Samples 9 to 15 (Examples Employing a Drum Support)

The above dope composition B was placed in a vessel, and heated at 110° C. while stirring to obtain a solution (a dope) in which the cellulose triacetate was dissolved. The resulting dope was filtered, and uniformly cast at 5° C. in wet thickness of 120 μm according to a triple layer (5 μm+110 μm+5 μm) casting method on the stainless steel drum support of a drum type casting apparatus, allowed to stand for 6 seconds to form a film, and the resulting film was separated from the support. The residual solvent content in the separated film was 200 weight %.

The separated film was hold with a tenter and transported at 110° C. for 30 minutes in a drying zone to obtain a triacetyl cellulose film. Thus, film samples 9 to 15 were obtained.

The water content by weight % (measured according to the Karl Fisher's method) of the dope for each sample was adjusted to those as shown in Table 1.

The above obtained film samples were evaluated for surface smoothness, tear strength, folding endurance, anti-curl property in water, cloudiness and fog. The evaluation methods and evaluation criteria are shown below.

(1) Surface Smoothness of Film

The surface smoothness of the film samples was evaluated as follows:

As shown in FIG. 1, each sample was exposed to parallel light beams 2, and the transmitted light was projected to form a projected image on a screen 3. The projected image is visually observed. The evaluation criteria are as follows:

A: No pattern images were observed on the screen.

B: Weak wavy lines were observed on the screen.

C: Strong wavy lines were observed on the screen

D: Clear streaks were observed on the screen.

In the above criteria, A and B can be put into practical use. C shows lowest limitation that can be put into practical use, which may be problematic in view of practicality. D cannot be put into practical use.

The surface smoothness of film may be varied depending on different portions of the film, even if the film is manufactured under the same manufacturing condition. Therefore, the surface smoothness was observed at three portions of each film sample, and the average was evaluated.

(2) Tear Strength of Film

The tear strength of the film samples was measured with a tearing meter (produced by Toyoseiki Seisakusho Co., Ltd.), and represented in terms of a 120 $\mu$m thick film.

(3) Anti-Curl Property in Water

Each film sample was cut into a 10×10 cm size, immersed in water at room temperature for 1 hour, and then taken out of water. Immediately after that, anti-curl property of the resulting sample was measured according to ISO-4330 method A.

The evaluation criteria are as follows:

Less than 10 (liter/m): excellent in practicality

Ten (liter/m) to less than 20 (liter/m): good in practicality

Not less than 20 (liter/m): poor in practicality (4) Folding Endurance

Folding endurance of each sample was measured at ordinary temperature and humidity according to JIS 8-115-63.

(5) Photographic Property (Fog)

A silver halide emulsion layer for X-ray as disclosed in Examples of U.S. Pat. No. 5,470,700 was coated on each of the samples to give a dry thickness of 17 $\mu$m, and a protective inactive gelatin layer was further coated on the emulsion layer to give a dry thickness of 2 $\mu$m. The thus obtained photographic film was stored at 25° C. and 65% RH for 24 hours, tightly closed and further stored at 50° C. for 7 days. The resulting film was developed employing an automatic developing machine for an X-ray film, and density at unexposed portions was measured.

(6) Cloudiness

Cloudiness of the film was visually observed, and the evaluation criteria are as follows:

A: Completely transparent

B: Slight cloudiness observed at a part of the film sample.

C: Apparent cloudiness observed

In the above criteria, A and B can be put into practical use, but C can not.

The results are shown in Table 1.

TABLE 1

| Sample No. | Dope | Water content of cellulose triacetate solution (weight %) | Residual solvent amount in separated film (weight %) | Surface smoothness of film | Tear strength (g) | 2ND BU | Cloudiness | Folding endurance (frequency) | Fog | Remarks |
|---|---|---|---|---|---|---|---|---|---|---|
| 1 | A | 0.05 | 120 | C | 49 | 17 | A | 80 | 0.08 | Comp. |
| 2 | A | 0.10 | 120 | B | 53 | 10 | A | 82 | 0.04 | Inv. |
| 3 | A | 1.0 | 120 | B | 58 | 7 | A | 83 | 0.02 | Inv. |
| 4 | A | 3.0 | 120 | A | 56 | 5 | A | 84 | 0.01 | Inv. |
| 5 | A | 13 | 120 | A | 58 | 5 | A | 82 | 0.01 | Inv. |
| 6 | A | 15 | 120 | B | 54 | 5 | A | 81 | 0.01 | Inv. |
| 7 | A | 16 | 120 | C | 41 | 12 | C | 65 | 0.01 | Comp. |
| 8 | B | 1.0 | 170 | B | 51 | 8 | A | 80 | 0.03 | Inv. |
| 9 | B | 0.05 | 200 | C | 48 | 17 | A | 79 | 0.10 | Comp. |
| 10 | B | 0.10 | 200 | B | 52 | 10 | A | 81 | 0.04 | Inv. |
| 11 | B | 1.0 | 200 | A | 57 | 6 | A | 80 | 0.03 | Inv. |
| 12 | B | 3.0 | 200 | A | 54 | 3 | A | 84 | 0.01 | Inv. |
| 13 | B | 13 | 200 | A | 55 | 3 | A | 82 | 0.01 | Inv. |
| 14 | B | 15 | 200 | B | 53 | 4 | B | 85 | 0.01 | Inv. |
| 15 | B | 16 | 200 | C | 40 | 12 | C | 69 | 0.01 | Comp. |

Inv.: Invention, Comp.: Comparative

As is apparent from Table 1, the samples (sample Nos. 2 through 6, 8, and 10 through 14) of the invention have excellent properties in view of practicality. Generally, films manufactured employing a belt type casting support are superior in tear strength, and films (sample Nos. 2 through 6) manufactured according to the method of the invention provide especially excellent tear strength. Further, films manufactured employing a drum casting support are superior in anti-curl property in water, and films (sample Nos. 8, and 10 through 14) manufactured according to the method of the invention provide especially excellent anti-curl property in water.

What is claimed is:

1. A method of manufacturing a cellulose ester film, the method comprising the steps of:

dissolving a cellulose ester and a plasticizer in a solvent comprising a 1,3-dioxolane to obtain a cellulose ester solution at a temperature of from 60 to 110° C.;

casting the solution on a rotating support and cooling the solution sufficiently to form a cellulose ester gel;

separating the cellulose ester gel from the support; and drying the separated gel to form a cellulose ester film, wherein the cellulose ester solution contains water in an amount of 0.06 to 15 weight % based on the weight of the solution, and the residual solvent content in the cellulose ester gel at the separation step from the support is 50 to 450 weight %, the residual solvent content being defined as (weight of volatile components remaining in the gel)/(weight of film after heating at 115° C. for 1 hour), the weight of volatile components being obtained by subtracting the weight of the film that is obtained after heating the gel for 1 hour at 115° C. from the weight of the gel before heating.

2. The method of claim 1, wherein the time from the beginning of the casting step to the beginning of the separation step is 3 seconds to 2 minutes.

3. The method of claim 1, wherein the casting is multi-layer casting.

4. The method of claim 1, wherein the residual solvent content of the film after drying is 0.5 to 3.5 weight %.

5. The method of claim 1, wherein the plasticizer content of the solution is 8 to 20 weight % based on the cellulose ester content.

6. The method of claim 1, wherein the plasticizer is a phosphate.

7. The method of claim 1, wherein the drying is carried out by micro waves.

8. The method of claim 1, wherein the cellulose ester solution has a water content of 0.1 to 15 weight %.

9. The method of claim 8, wherein the cellulose ester solution has a water content of 1 to 15 weight %.

10. The method of claim 9, wherein the cellulose ester solution has a water content of 3 to 13 weight %.

11. The method of claim 1, wherein the 1,3-dioxolane is one or more selected from the group consisting of 1,3-dioxolane, 2-methyl-1,3-dioxolane, 4-methyl-1,3-dioxolane, 2-ethyl-1,3-dioxolane, 4-ethyl-1,3-dioxolane, and 2,2-dimethyl-1,3-dioxolane.

12. The method of claim 1, wherein the rotating support is a drum support.

13. The method of claim 12, wherein the casting is carried out at a temperature of from 5 to 30° C.

14. The method of claim 1, wherein the rotating support is a belt support.

* * * * *